Figure 1:
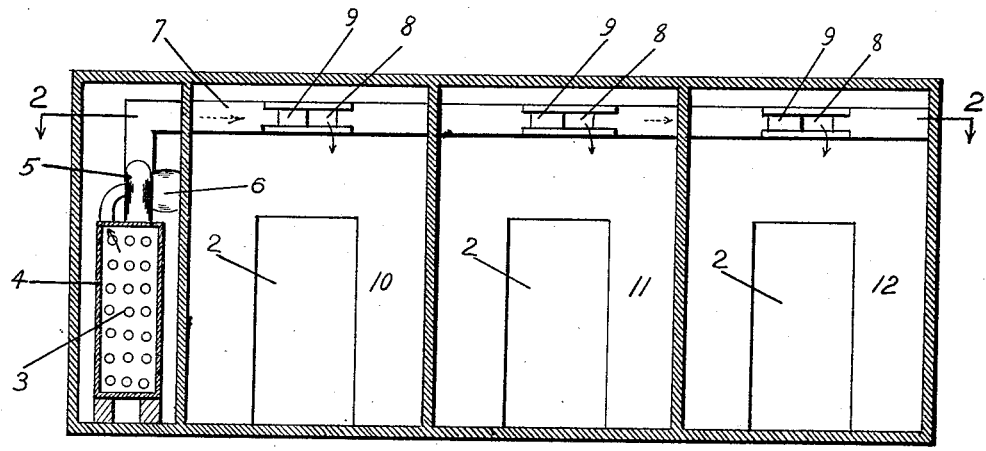

Aug. 4, 1931.   R. J. BROADBENT   1,817,875
RIPENING OF BANANAS
Filed May 29, 1929

Patented Aug. 4, 1931

1,817,875

UNITED STATES PATENT OFFICE

ROBERT JOSEPH BROADBENT, OF MAROUBRA JUNCTION, NEW SOUTH WALES, AUSTRALIA

RIPENING OF BANANAS

Application filed May 29, 1929, Serial No. 367,028, and in Australia April 10, 1929.

This invention relates to the ripening of bananas and particularly to methods of ripening employed by distributors who receive the fruit in a green state.

There are various known methods of ripening bananas, the most common of which consists in placing the fruit in a sealed chamber in which a gas jet burns until the oxygen present in the atmosphere has been consumed. The fruit thus ripens in a warm, dry atmosphere, permeated by carbon monoxide generated by the combustion of the gas, consequently the fruit "sweats" and loses some of its water content and weight while absorbing some of the contaminated air, with a result that the full flavor of naturally ripened fruit is prevented from developing. A further result of this unnatural method of ripening is that early decomposition sets in, resulting in serious loss and necessitating rapidity of distribution.

In another known method the fruit is subjected to two successive and particular sets of conditions of temperature and humidity in chambers cooled by brine pipes and supplied with vapor by a ventilating and heating appliance of a complicated nature, but it is generally found that the cost of the plant necessitated by this process is prohibitive.

The object of the present invention is to avoid the defects and difficulties in the above mentioned methods of banana ripening, by an improved method whereby the fruit is ripened under hygienic conditions, without the necessity for the use of an expensive plant, and whereby the natural flavor is allowed to develop.

The invention consists in a method of ripening bananas, according to which the fruit, in the green or unripe state, is initially brought to a comparatively low uniform temperature by contact with circulating cool dry air, is then subjected to the action of slightly warmer circulating air of high humidity, and finally subjected to the action of air of a slightly increased temperature but of practically unaltered humidity.

Preferably the temperature in the last stage of the ripening is reduced slightly after the fruit has attained a yellow tinge to prevent "cooking" or overheating thereof.

Thus it is seen that the method consists of three definite stages, which could if desired be carried out within a single chamber, but this would result in "batch" production of ripened fruit. It is therefore found to be more desirable to move the fruit successively through three separate chambers in which the requisite conditions of each stage in the process of ripening are maintained.

The principal advantage of this method is that the fruit ripens under hygienic conditions, in such manner that the natural flavor is fully developed and the natural firmness is retained; furthermore the ripening of all the pieces of fruit is uniform and the fruit will remain in good condition for a considerable period before decomposition commences, permitting delays in distribution to occur without loss of fruit.

It is to be noted that the first stage of the method, during which the whole of the fruit is brought to a comparatively low temperature, establishes a uniform initial condition and allows the ripening of the fruit to be carried out uniformly.

Further, when it is not desired to ripen the fruit rapidly, it may be kept for a considerable period in the green state by retaining it under the conditions existing in the first stage.

The values of the temperature and humidity in the various stages depends upon circumstances, such as the initial temperature of the incoming green fruit, and the length of time which it is desired to expend on the ripening process, but in order to fully explain the invention reference is now had to the accompanying drawings which depict diagrammatically a suitable construction of plant to carry out the method. In the description normal conditions are assumed, and the values of temperature and humidity are those best suited for these normal conditions.

Figure 2:
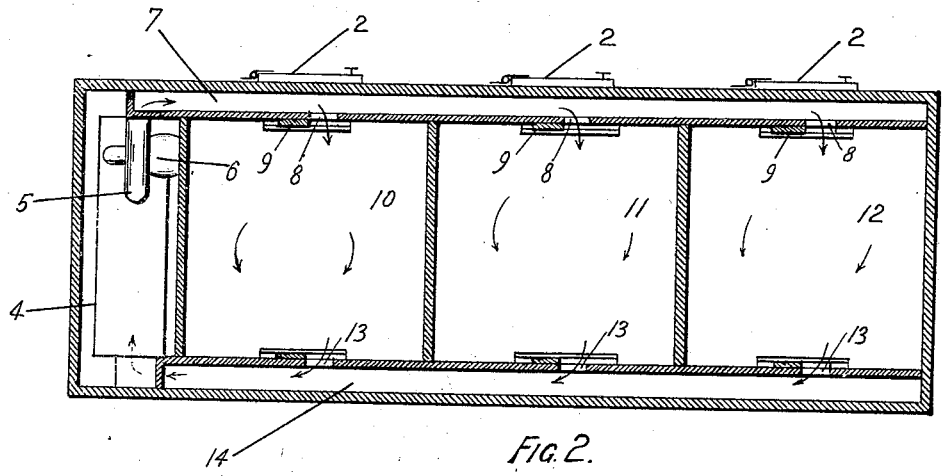

In the drawings:

Fig. 1 is a longitudinal sectional elevation thereof and Fig. 2 is a sectional plan on the plane 2, 2 of Fig. 1.

Each of the three stages of the ripening process is carried out in one of three closed chambers in which the fruit is successively placed for the required period. To permit access to the chambers they are fitted with doors 2.

A battery of refrigerator coils 3, supplied with refrigerant from a conventional compressor unit (not shown), is enclosed in a casing 4 and cold air from around these coils is drawn from the casing (as shown by arrows) by means of a fan or blower 5, driven by an electric motor 6, which delivers it into a wind channel 7 provided with openings or ports 8 controlled by sliding shutters 9 and opening respectively into one side of each of three chambers 10, 11 and 12. On the opposite sides of the chambers are outlet ports 13.

Cool air in such quantities as are sufficient to establish and maintain the required conditions, is admitted to the respective chambers through the ports 8, being regulated by adjustment of the shutters 9. The cool air is admitted at such low pressure that while insufficient to produce a direct cross current from the inlet to the outlet ports, it displaces the air within the chambers and expels it through the outlet ports 13 into a wind channel 14 which delivers it back to casing 4 enclosing coils 3, so that substantially the same body of air circulates through the system, minimizing the possibility of injury to, or contamination of, the fruit by impure air and alteration of the chamber conditions due to external atmospheric or climatic changes.

The green bananas are placed in the chamber 10 where, by the circulation of the chilled air, the temperature is maintained at approximately 60° F., and are allowed to remain therein for a period sufficient to reduce all the fruit to this initial temperature. It is found that approximately 24 hours is a sufficient period to produce this uniformity of temperature, but this factor naturally depends directly upon the temperature of the bananas when introduced into the chamber, and may be modified to meet such conditions.

During this first stage the ripening progresses very slowly and, if it is desired to retard it, the fruit is allowed to remain in this chamber as long as required, during which period it is retained in substantially the green state.

The fruit is then transferred to the chamber 11 where the conditions of the second stage of the ripening are maintained, these conditions being a temperature of approximately 65° F. and a humidity of approximately 85%. It is found that in summer and in climates where the humidity of the atmosphere is relatively high both the temperature and humidity in this (and the third) stage may be regulated to the desired values by the use of the cold air only, but should the atmospheric humidity be below the required value, as in winter or in a dry atmosphere, the required water vapor may be added to the air in the chamber by means of a suitable "vaporizer" or "humidifier" of known type (not shown). The "vaporizer" will also tend to increase the temperature of the chamber in which it is used, a result which will be necessary in cold weather when the desired temperature of the chamber is not otherwise readily maintained; but should the increase in temperature be undesirable it may be corrected by the admittance of a sufficient quantity of cold air from wind channel 7, the entry of which also serves to distribute the water vapor supplied by the humidifier uniformly throughout the chamber.

The period for which the fruit is allowed to remain in chamber 11 under the conditions obtaining in the second stage is approximately 48 hours, but this period may be varied according to requirements as hereinbefore explained. During this stage the bananas begin to assume a yellow color and are gradually ripening while retaining their original size and firmness.

The fruit is then placed in the chamber 12 where the ripening to the desired stage is effected, the temperature therein being approximately 68°–70° F. and the humidity 80–85%, these factors being controlled by means similar to those described for the second stage.

It is usually necessary, in order to prevent "cooking" or overheating of the fruit, to reduce the temperature obtaining in the third stage when the fruit has assumed a yellow color, such reduction preferably being to 64° F. approximately.

The fruit is allowed to remain in chamber 12 until sufficiently ripe, the period naturally depending upon the degree of ripeness attained in the first and second stages, but it is found that between 24 and 48 hours is sufficient with fruit that has been treated in the first and second stages as above described and which was initially in the average green state. However if the fruit be retained in this, or either of the other chambers under the above described conditions for a longer period than is actually necessary, it is found that over-ripeness does not result.

What I claim and desire to secure by Letters Patent is:—

1. A method of ripening bananas which comprises first subjecting the fruit to air of moderate temperature for a period sufficient to bring it to approximately the same temperature, then to air of slightly increased temperature and of high humidity for a period sufficient to cause it to commence to turn yellow, and finally to air of still further slightly increased temperature and of high humidity for the period required to sufficiently ripen it, characterized in that the required respective temperatures are maintained by air currents of appropriate temperature and volume.

2. A method of ripening bananas according to claim 1 in which the successive steps in the ripening process are carried out in separate chambers in which the required conditions respectively are maintained.

3. A method of ripening bananas which comprises placing the fruit in a chamber wherein the temperature of the air is maintained at approximately 60° F. and retaining it therein for a period sufficient to bring it to approximately that temperature, then placing it in a second chamber, wherein an air temperature of approximately 65° F and a relative humidity of approximately 85% are maintained, for a period sufficient to initiate the yellowing development, and finally placing it in a chamber wherein an air temperature of approximately 68°-70° F. and a relative humidity of approximately 80-85% are maintained, for the period required to sufficiently ripen it, characterized in that the required respective temperatures are maintained by air currents of appropriate temperature and volume.

4. A method of ripening bananas, according to claim 1 further characterized in that the temperature is slightly reduced as soon as the fruit in the third stage has attained a uniform yellow tinge.

5. A method of ripening bananas, which comprises placing the green fruit in a chamber, passing through the chamber a light current of air of temperature and volume sufficient to maintain the air therein at a moderate temperature, and retaining the fruit therein until it is brought to approximately the same temperature, then subjecting it to the action of air of a high degree of humidity and of slightly increased temperature maintained by a suitable air current, until it commences to turn yellow, and finally and sufficiently ripening it by subjecting it to the action of air of a high degree of humidity and still further slightly increased temperature maintained by a suitable air current.

Signed at Sydney, this twenty-sixth day of April, A. D. 1929.

ROBERT JOSEPH BROADBENT.